United States Patent
Chen et al.

(10) Patent No.: US 9,859,942 B2
(45) Date of Patent: Jan. 2, 2018

(54) PROTECTIVE COVER AND PORTABLE ELECTRONIC DEVICE ASSEMBLY EMPLOYING THE SAME

(71) Applicant: Chiun Mai Communication Systems, Inc., New Taipei (TW)

(72) Inventors: Chun-Chih Chen, New Taipei (TW); Kuan-Chang Lin, New Taipei (TW); Mong-Hau Tsai, New Taipei (TW)

(73) Assignee: Chiun Mai Communication Systems, Inc., New Taipei (TW)

(*) Notice: Subject to any disclaimer, the term of this patent is extended or adjusted under 35 U.S.C. 154(b) by 80 days.

(21) Appl. No.: 14/886,244

(22) Filed: Oct. 19, 2015

(65) Prior Publication Data

US 2016/0182115 A1 Jun. 23, 2016

(30) Foreign Application Priority Data

Dec. 18, 2014 (CN) .......................... 2014 1 0786713

(51) Int. Cl.
*H04M 1/00* (2006.01)
*H04B 1/3888* (2015.01)

(52) U.S. Cl.
CPC .................................. *H04B 1/3888* (2013.01)

(58) Field of Classification Search
CPC .. H04B 1/3888; H04B 5/0031; H04B 5/0037; H04M 1/0214; H04M 1/0247; H04M 2250/16; H04M 1/0202; H04M 1/0216; H04M 1/0254; H04M 1/04; H04M 1/23; H04M 1/72527; G06F 2200/1633; G06F 1/1626; G06F 1/1683; G06F 3/14
USPC ......... 455/575.8, 575.4, 575.3, 575.1, 550.1, 455/90.3; 379/428.01
See application file for complete search history.

(56) References Cited

U.S. PATENT DOCUMENTS

| 2013/0314338 A1* | 11/2013 | Nam | ....................... G06F 3/041 345/173 |
| 2014/0285961 A1* | 9/2014 | Nam | ..................... G06F 1/1616 361/679.28 |

* cited by examiner

*Primary Examiner* — Shaima Q Aminzay
(74) *Attorney, Agent, or Firm* — ScienBiziP, P.C.

(57) ABSTRACT

A protective cover for portable electronic device includes a main body, a display module and a connecting module. The main body includes a first cover and a second cover that is foldable relative to the first cover. The second cover is configured to detachably attach the portable electronic device. The display module is attached to the first cover. The connecting module is attached to the second cover and electronically coupled to the display module. The connecting module is configured to receive display information from the portable electronic device and output the display information to the display module.

11 Claims, 5 Drawing Sheets

PROTECTIVE COVER AND PORTABLE ELECTRONIC DEVICE ASSEMBLY EMPLOYING THE SAME

FIELD

The subject matter herein generally relates to a protective cover, and particularly to a protective cover for portable electronic device.

BACKGROUND

Portable electronic devices, such as cellular phone, or tablet computer are widely used. Because these portable electronic devices are mobile and are often carried around by the user, protective covers have been designed to protect the devices from scratches, impacts, dust and water. However, these protective covers are only used for protecting the devices, additional function of the protective cover is strongly desired.

BRIEF DESCRIPTION OF THE DRAWINGS

Implementations of the present technology will now be described, by way of example only, with reference to the attached figures.

DETAILED DESCRIPTION

Figure 1:
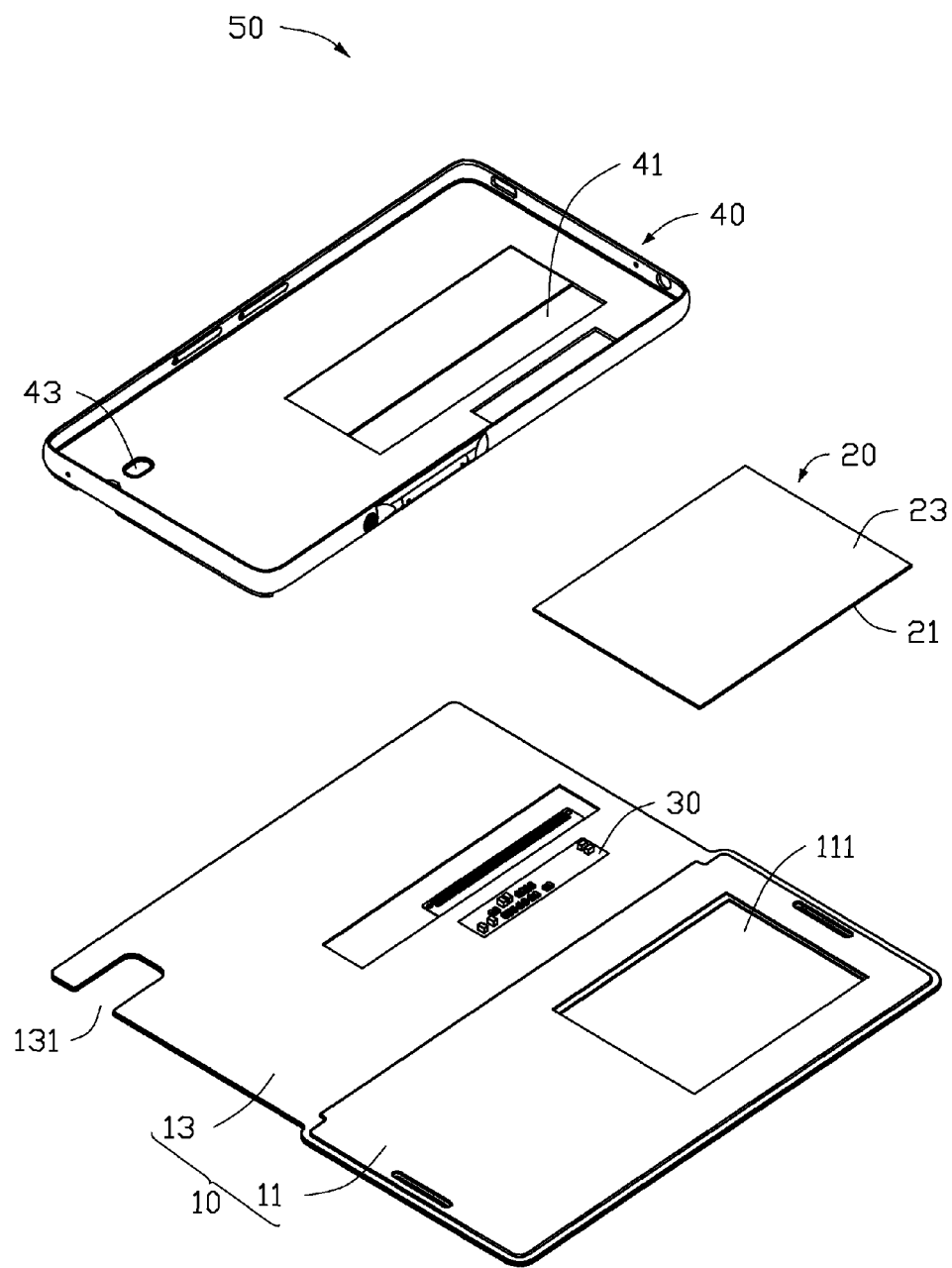
FIG. 1 is a schematic view of a first embodiment of a protective cover for a portable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

Figure 3:
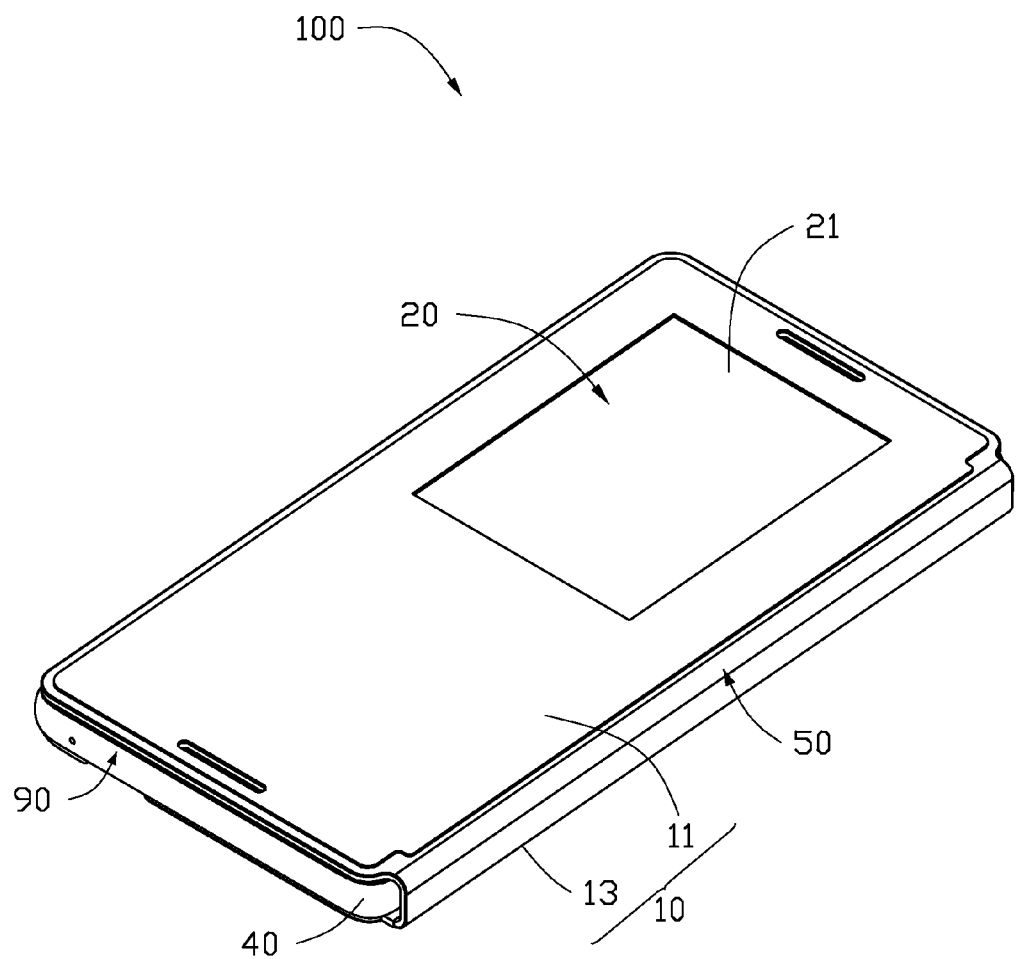
FIG. 3 is a schematic view of the portable electronic device assembly showing the protective cover in a closed state.
Figure 4:
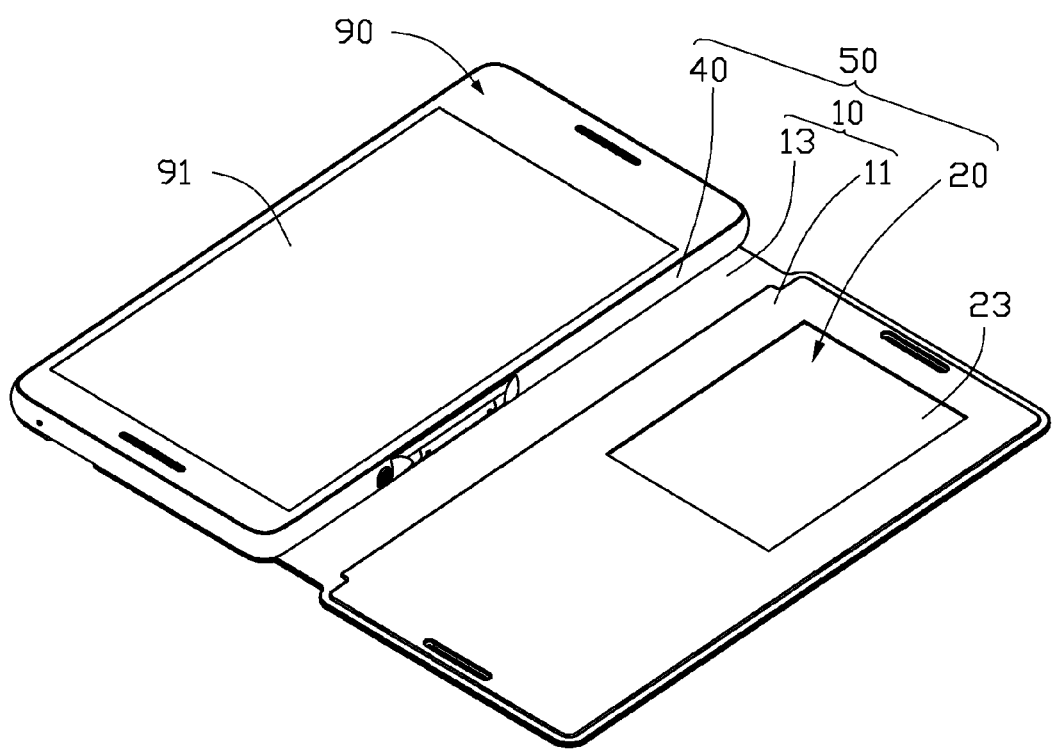
FIG. 4 is a schematic view of the portable electronic device assembly of FIG. 3 showing the protective cover in an open state.

FIG. 1 illustrates a schematic view of a first embodiment of a protective cover 50 for a portable electronic device. FIG. 3 and FIG. 4 illustrate schematic views of a portable electronic device assembly showing the protective cover 50 is in a closed state and in an open state, respectively. Referring now to FIG. 1, FIG. 3 and FIG. 4, the protective cover 50 is configured to contain and cover a portable electronic device 90. The protective cover 50 includes a main body 10, a display module 20, a connecting module 30, and a case 40.

The main body 10 can be made by flexible materials, such as real leather or artificial leather. The main body 10 includes a first cover 11 (such as a front cover) and a second cover 13 (such as a rear cover) which can be foldable relative to each other to close the protective cover 50 and contain the portable electronic device 90. In the exemplary embodiment, the first cover 11 is a planar sheet.

The display module 20 can be a double-sided display which includes a first screen 21 and a second screen 23. The first screen 21 and second screen 23 can display information individually. The first cover 11 has a mounting opening 111 defined therethrough. The first and second screens 21 and 23 can be received in the mounting opening 111, and can be fixed in the mounting opening 111 by, such as, adhesive materials. When the first and second screens 21 and 23 are received in the mounting opening 111, the first and second screens 21 and 23 are stacked together, the first screen 21 is located adjacent to an outer surface of the first cover 11 (see FIG. 3), and the second screen 23 is located adjacent to an inner surface of the first cover 11 (see FIG. 4). Both the first and second screens 21 and 23 can be flexible screens.

Figure 2:
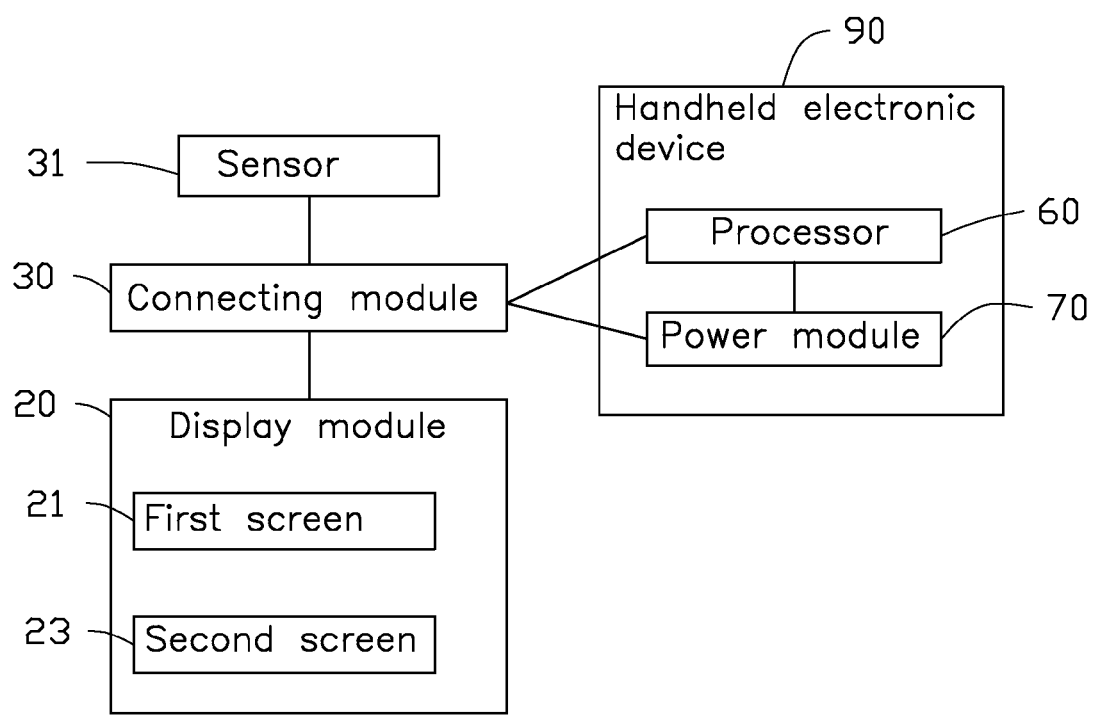
FIG. 2 is a block diagram of a portable electronic device assembly including the protective cover of FIG. 1 and a portable electronic device.

The first and second screens 21 and 23 can receive information to display from a portable electronic device (such as a portable electronic device 90 as shown in FIGS. 2-4) via the connecting module 30. The connecting module 30 can be a connector, such as a plug, mounted on an inner surface of the second cover 13.

The case 40 is attached to the inner surface of the second cover 13 (see FIGS. 3-4), and is configured to hold the portable electronic device. The case 40 has an opening 41 defined through a bottom wall thereof. The opening 41 is positioned corresponding to the connecting module 30, and configured to allow the connecting module 30 to extend through to couple to the portable electronic device. The case 40 further has a through hole 43 defined therethrough. The second cover 13 has a cutout 131 defined corresponding to the through hole 43. When the portable electronic device is held by the case 40, a camera of the portable electronic device can be exposed from the through hole 43 and the cutout 131.

FIG. 2 illustrates a block diagram of a portable electronic device assembly 100 including the protective cover 50 of FIG. 1 and a portable electronic device 90. The portable electronic device 90 can be, but is not limited to, a cellular phone, a tablet computer, or an audio player. The portable electronic device 90 includes a processor 60 and a power module 70. The connecting module 30 of the protective cover 50 is electronically coupled to both the processor 60 and the power module 70 via a connector (not shown) of the portable electronic device 90 mating with the connecting module 30. The protective cover 50 further includes a sensor 31 electronically coupled to the connecting module 30. The sensor 31 can be mounted adjacent to a junction between the first and second covers 11 and 13, and is configured to detect the state of the protective cover 50. The detection signal of the sensor 31 can be transmitted to the processor 60 via the connecting module 30. The processor 60 is configured to output information for display to the first and second screens 21 and 23 via the connecting module 30. The power module 70 is configured to power the first and second screens 21 and 23 via the connecting module 30.

FIG. 3 illustrates a schematic view of the portable electronic device assembly 100 showing the protective cover 50 in a closed state. As shown in FIG. 3, in the closed state, inner surfaces of first cover 11 and second cover 13 face each other and can sandwich the portable electronic device 90 between each other, and the first cover 11 and second cover 13 are arranged substantially parallel to each other. A main display 91 (see FIG. 4) of the portable electronic device 90 is shield by the first cover 11 and the first screen 21 can expose from the protective cover 50, such that the first screen 21 can receive information (such as current time, current date, message, and/or information of a coming call) from the portable electronic device 90, and display the information in the closed state.

FIG. 4 is similar to FIG. 3, but showing the protective cover 50 in an open state. As illustrated in FIG. 4, in the open state, the first cover 11 can be opened at various angles towards second cover 13. Both the main display 91 of the portable electronic device 90 and the second screen 23 can be exposed, such that the second screen 23 can display information of the portable electronic device 90 different from the information displayed on the main display 91. For example, the second screen 23 and the main display 90 can display user interfaces of two different applications, respectively, in the open state.

It can be understood that, the first and second screens 21 and 23 can display either same information or different information. For example, when the sensor 31 detects that the protective cover 50 is in the closed state, the processor 60 of the portable electronic device 90 can activate the first screen 21 and deactivate the second screen 23, such that only the first screen 21 displays information. When the sensor 31 detects that the protective cover 50 is in the open state, the processor 60 of the portable electronic device 90 can deactivate the first screen 21 and activate the second screen 23, such that only the second screen 23 displays information.

Figure 5:
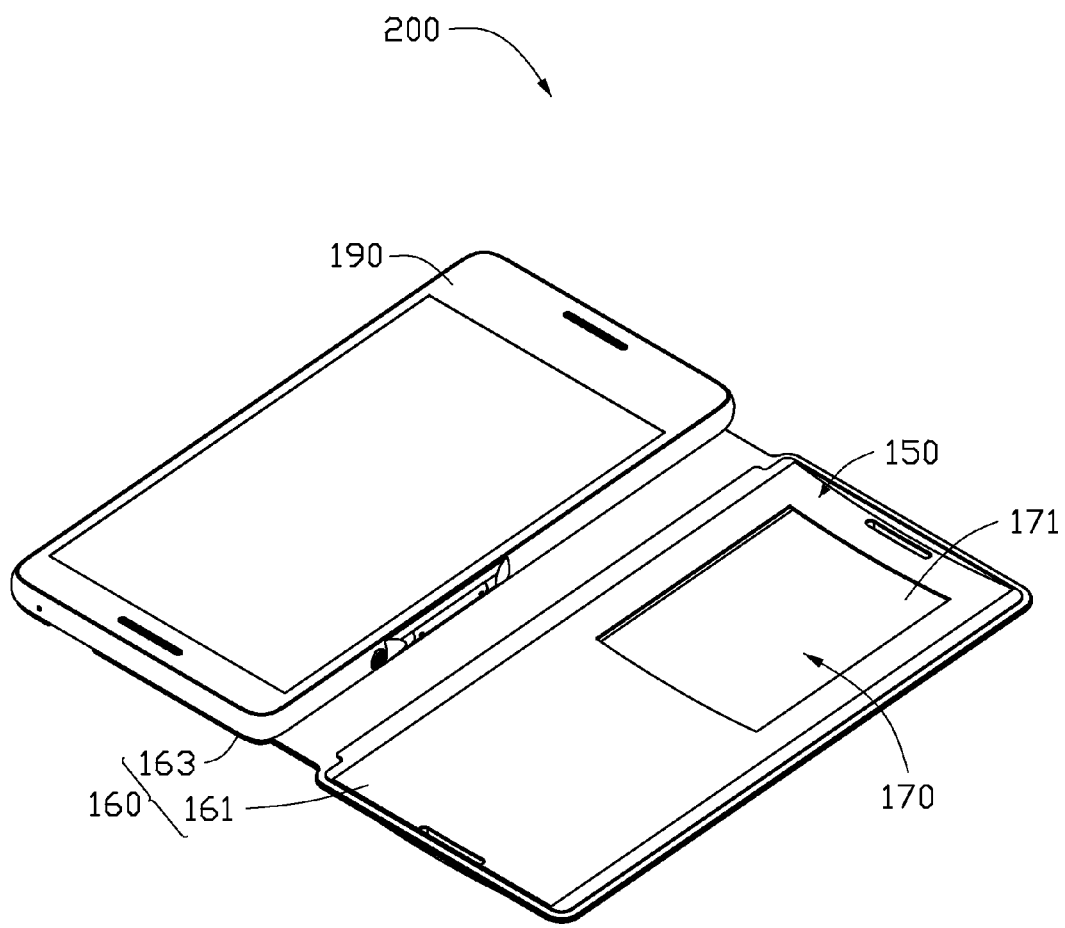
FIG. 5 illustrates a schematic view of a second embodiment of a portable electronic device assembly.

FIG. 5 illustrates a schematic view of a second embodiment of a portable electronic device assembly 200. The portable electronic device assembly 200 includes a portable electronic device 190 and a protective cover 150 configured to cover and contain the portable electronic device 190. The protective cover 150 includes a main body 160 and a display module 170 attached to the main body 160. The main body 160 includes a first cover 161 and a second cover 163 which can be foldable relative to each other. The protective cover 150 differs from the protect cover 50 shown in FIG. 4 only in that: the first cover 161 is substantially curved, and the display module 170 includes a double-sided flexible screen 171 assembled to the first cover 161. The double-sided flexible screen 171 has a function as a combination of the first and second screens 21 and 23.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A protective cover for portable electronic device comprising:
   a main body comprising a first cover and a second cover that is foldable relative to the first cover; the second cover configured to detachably attach the portable electronic device thereto;
   a display module attached to the first cover, wherein the display module comprises a first screen and a second screen, the first screen is located adjacent to an outer surface of the first cover, and the second screen is located adjacent to an inner surface of the first cover;
   a connecting module attached to the second cover and electronically coupled to the display module, the connecting module configured to receive display information from the portable electronic device, and output the display information to the display module; and
   a sensor mounted adjacent to a junction between the first cover and the second cover and electronically coupled to the connecting module, the sensor configured to detect a state of the protective cover;
   wherein when the state of the protective cover is closed, the first cover and the second cover sandwich the portable electronic device between each other, and the first screen displays the display information; and
   when the state of the protective cover is open, the first cover is opened at an angle towards the second cover, and the second screen displays the display information.

2. The protective cover of claim 1, wherein the first cover has a mounting opening defined therethrough, and the first screen and the second screen are received in the mounting opening and stacked together.

3. The protective cover of claim 1, wherein the first cover is substantially curved, and the display module includes a double-sided flexible screen assembled to the first cover.

4. The protective cover of claim 1, further comprising a case attached to the second cover, wherein the case is configured to hold the portable electronic device.

5. The protective cover of claim 4, wherein the case has an opening defined through a bottom wall therethrough, the opening is positioned corresponding to the connecting module, and configured to allow the connecting module to extend through to couple to the portable electronic device.

6. A portable electronic device assembly comprising:
   a protective cover comprising:
      a main body comprising a first cover and a second cover that is foldable relative to the first cover, the second cover being configured to detachably attach the portable electronic device thereto;
      a display module attached to the first cover, wherein the display module comprises a first screen and a second screen, the first screen is located adjacent to an outer surface of the first cover, and the second screen is located adjacent to an inner surface of the first cover;
      a connecting module attached to the second cover and electronically coupled to the display module; and a sensor electronically coupled to the connecting module, the sensor is configured to detect a state of the protective cover; and the portable electronic device comprising a processor electronically coupled to the connecting module; the processor configured to output display information to the display module via the connecting module;

wherein when the first cover and the second cover sandwich the portable electronic device between each other, the sensor detects that the protective cover is in a closed state and the processor controls the first screen to display the display information; and when the first cover is opened at an angle towards the second cover, the sensor detects that the protective cover is in an open state and the processor controls the second screen to display the display information.

7. The portable electronic device assembly of claim 6, wherein the portable electronic device further comprises a power module electronically coupled to the connecting module, and the power module is configured to power the display module.

8. The portable electronic device assembly of claim 6, wherein the first cover has a mounting opening defined therethrough, and the first screen and the second screen are received in the mounting opening and stacked together.

9. The portable electronic device assembly of claim 6, wherein the display module includes a double-sided flexible screen assembled to the first cover.

10. The portable electronic device assembly of claim 6, wherein the protective cover further comprises a case attached to the second cover, and the case is configured to hold the portable electronic device.

11. The portable electronic device assembly of claim 10, wherein the case has an opening defined through a bottom wall therethrough, and the opening is positioned corresponding to the connecting module and configured to allow the connecting module to extend through to couple to the portable electronic device.

\* \* \* \* \*